US009968154B2

United States Patent
Tenenbaum et al.

(10) Patent No.: US 9,968,154 B2
(45) Date of Patent: May 15, 2018

(54) PROTECTIVE EQUIPMENT HAVING FRANGIBLE ENERGY ABSORBING ELEMENTS

(71) Applicant: Marie Hochstein, Troy, MI (US)

(72) Inventors: Jeffrey Tenenbaum, West Bloomfield, MI (US); John Stephen LeRoy, Clinton Township, MI (US); Peter A. Hochstein, Troy, MI (US)

(*) Notice: Subject to any disclaimer, the term of this patent is extended or adjusted under 35 U.S.C. 154(b) by 793 days.

(21) Appl. No.: 13/838,493

(22) Filed: Mar. 15, 2013

(65) Prior Publication Data

US 2014/0259314 A1 Sep. 18, 2014

(51) Int. Cl.
*A42B 3/12* (2006.01)
*A42B 3/04* (2006.01)

(52) U.S. Cl.
CPC ............. *A42B 3/128* (2013.01); *A42B 3/046* (2013.01)

(58) Field of Classification Search
CPC .. A42B 3/046; A42B 3/00; A42B 3/08; A42B 3/14; A42B 3/30; A42B 3/121; G08B 25/016; A61B 5/0004; A61B 5/1122; A61B 5/6803; A61B 5/7282; A41D 1/002; D03D 1/0088; Y10S 2/909; G01B 7/003
See application file for complete search history.

(56) References Cited

U.S. PATENT DOCUMENTS

| | | | |
|---|---|---|---|
| 2,879,513 A * | 3/1959 | Hornickel et al. | 2/414 |
| 3,054,111 A * | 9/1962 | Hornickel et al. | 2/416 |
| 7,862,045 B2 * | 1/2011 | Hodge | 273/371 |
| 8,253,559 B2 * | 8/2012 | Howard et al. | 340/539.32 |
| 8,766,798 B2 * | 7/2014 | Howard et al. | 340/539.32 |
| 8,884,756 B2 * | 11/2014 | Howard et al. | 340/539.32 |
| 8,890,686 B2 * | 11/2014 | Howard et al. | 340/539.32 |
| 8,981,952 B2 * | 3/2015 | Howard et al. | 340/669 |
| 9,041,528 B2 * | 5/2015 | Howard et al. | 340/539.11 |
| 9,129,499 B2 * | 9/2015 | Howard et al. | |
| 2005/0192727 A1 * | 9/2005 | Shostak et al. | 701/37 |

(Continued)

OTHER PUBLICATIONS

U.S. Army TACOM Contract; Contract No. W56HZV-04-P-L765; Aug. 9, 2004; Offered by Quantex Engineering, Inc. and Jeff Tenenbaum.

(Continued)

*Primary Examiner* — Bobby Muromoto, Jr.
(74) *Attorney, Agent, or Firm* — John S. LeRoy; Brooks Kushman P.C.

(57) ABSTRACT

A protective helmet having a protective shell with an interior surface and an exterior surface. A padding layer is affixed to the interior surface. The padding layer comprises a compliant material and a frangible material, such as glass foam. At least the frangible material is enclosed in a container. A detection circuit detects compromise of the frangible material, and outputs an indicator in the event the compromise is detected. The detection circuit may include a frangible wire configured to break in the event the frangible material is compromised. The indicator may include an LED, and/or radio-frequency signals. The radio-frequency signal may include an identifier for the helmet. The padding layer may include a plurality of pads each containing compliant material and frangible material. The plurality of pads may include one or more fasteners for releaseably affixing the pads to the interior surface of the protective shell.

18 Claims, 2 Drawing Sheets

(56) References Cited

U.S. PATENT DOCUMENTS

| | | | |
|---|---|---|---|
| 2006/0025897 A1* | 2/2006 | Shostak et al. | 701/1 |
| 2007/0035528 A1* | 2/2007 | Hodge | 345/174 |
| 2012/0304365 A1* | 12/2012 | Howard et al. | 2/410 |
| 2012/0304367 A1* | 12/2012 | Howard et al. | 2/413 |
| 2012/0304767 A1* | 12/2012 | Howard et al. | 73/504.03 |
| 2012/0306438 A1* | 12/2012 | Howard et al. | 320/107 |
| 2012/0306639 A1* | 12/2012 | Howard et al. | 340/539.1 |
| 2012/0306641 A1* | 12/2012 | Howard et al. | 340/539.11 |
| 2012/0306642 A1* | 12/2012 | Howard et al. | 340/539.11 |
| 2012/0309300 A1* | 12/2012 | Howard et al. | 455/39 |
| 2014/0364772 A1* | 12/2014 | Howard et al. | 600/595 |

OTHER PUBLICATIONS

Ashton Automotive Testing, Inc.; Test Report for 5.0/10/0 MPH Barrier Bumper Test; Vehicle Model: Energy Absorbent Materials; Test Date: Sep. 13, 2004.

Crash Test Photos and Data Graphs for U.S. Army TACOM Contract No. W56HZV-04-P-L765; Aug. 9, 2004.

U.S. Army TACOM Contract; Contract No. W56HZV-05-P-L628; Apr. 5, 2005; Offered by Quantex Engineering, Inc. and Jeff Tenenbaum.

Amendment to U.S. Army TACOM Contract No. W56HZV-05-P-L628; May 6, 2005; Offered by Quantex Engineering, Inc. and Jeff Tenenbaum.

Truck Photos for U.S. Army TACOM Contract No. W56HZV-05-P-L628; May 6, 2005.

* cited by examiner

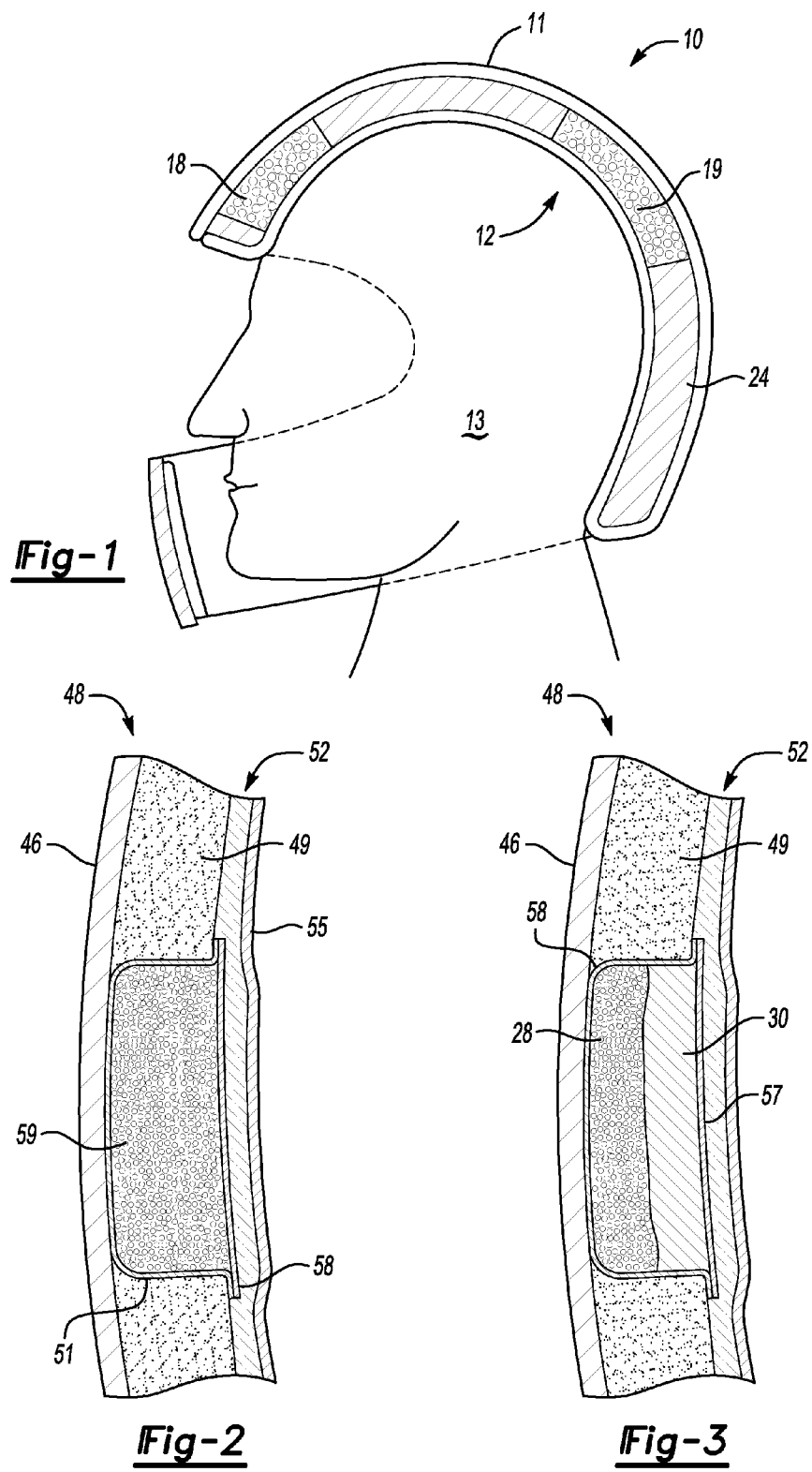

US 9,968,154 B2

PROTECTIVE EQUIPMENT HAVING FRANGIBLE ENERGY ABSORBING ELEMENTS

TECHNICAL FIELD

Embodiments of the present invention may be implemented in sporting goods such as helmets, padding and the like, military armor, vehicle bumpers and body panels, protective packaging, and other protective devices configured to absorb impact forces.

BACKGROUND

According to the Centers for Disease Control and Prevention (CDC), Traumatic Brain Injury (TBI) is a serious public health problem in the United States. Each year, traumatic brain injuries contribute to a substantial number of deaths and cases of permanent disability. The CDC reports that, on average, approximately 1.7 million people sustain a traumatic brain injury annually.

Through the TBI Act of 1996 (Public Law 104-166), Congress first charged the CDC with "determining the incidence and prevalence of traumatic brain injury in all age groups in the general population of the United States." In response, CDC has produced, Traumatic Brain Injury in the United States: Emergency Department Visits, Hospitalizations and Deaths 2002-2006.

Key findings from the CDC report show that, of the estimated 1.7 million people who sustain a TBI annually, 52,000 die, 275,000 are hospitalized, and 1.365 million are treated and released from an emergency department. TBI is a contributing factor to a third (30.5%) of all injury-related deaths in the United States. The CDC report also found that children aged 0 to 4 years, older adolescents aged 15 to 19 years, and adults aged 65 years and older are most likely to sustain a TBI.

Myriads of protective helmets and other protective devices have been developed to prevent or reduce TBI. Generally, protective helmets include a hard outer shell made of plastic or metal, and an inner cushion material made of foam. The configurations of the hard outer shell and the foam inner cushion vary to balance factors including performance, style, cost and comfort.

Embodiments of the present invention provide a novel approach to improving the performance of protective helmets and other protective devices using configurations of frangible energy absorbing materials. Embodiments of the present invention may be implemented in sporting goods including helmets, padding and the like, military armor, vehicle bumpers and doors/body panels, footwear, product packaging and other protective devices configured to absorb impact forces.

SUMMARY

One embodiment of the present invention includes a protective helmet comprising a protective shell having an interior surface and an exterior surface for protecting at least a portion of a person's head. A padding layer is affixed to at least a portion of the interior surface of the protective shell. The padding layer comprises a compliant material and a frangible material. The frangible material may include glass foam. At least the frangible material is enclosed in a container.

The protective helmet may additionally comprise a detection circuit configured to detect a compromise of the frangible material, and output an indicator in the event the compromise is detected. The detection circuit may include a frangible wire configured to break in the event the frangible material is compromised. The indicator may include an LED, and/or one or more radio-frequency signals. The radio-frequency signals includes an identifier for the helmet.

The padding layer may comprise a plurality of pads each containing compliant material and frangible material. The plurality of pads may include one or more fasteners for releaseably affixing the pads to the interior surface of the protective shell. The pads may include a frangible wire for electrical connection to a detection circuit configured to detect a compromise of the frangible material. The electrical connection may include electrically-conductive connectors for affixing the pads onto the helmet shell. The container may be defined in part by the compliant material, and/or the interior surface of the helmet shell.

Another embodiment includes padding for a protective helmet comprising a container for attachment to an interior shell of a protective helmet, the container including frangible material disposed in the container adjacent the protective shell, and compliant material disposed adjacent the frangible material. The padding may be attached to the interior shell with a releasable fastener, which may be electrically conductive.

The may also include a frangible wire attached to the frangible material and configured to break upon compromise of the frangible material. The frangible wire may be connected to a circuit configured to detect compromise of the frangible material. The frangible wire may be connected to the circuit using one or more electrically-conductive connectors for releaseably affixing the padding to the interior of the protective shell.

This Summary of various embodiments is not intended to be limiting. These and other embodiments are described below in the Drawings, in the Detailed Description, and in the claims.

BRIEF DESCRIPTION OF THE DRAWINGS

Embodiments of the present invention described herein are recited with particularity in the appended claims. However, other features will become more apparent, and the embodiments may be best understood by referring to the following detailed description in conjunction with the accompanying drawings, in which:

FIG. 1 is a cross-sectional view of a protective helmet according to an embodiment of the present invention;

FIG. 2 is a close-up cross-sectional view of a region of frangible material according to an embodiment of the present invention;

FIG. 3 is a close-up cross-sectional view of a region of frangible and compliant material according to an embodiment of the present invention;

DETAILED DESCRIPTION

Figure 4:
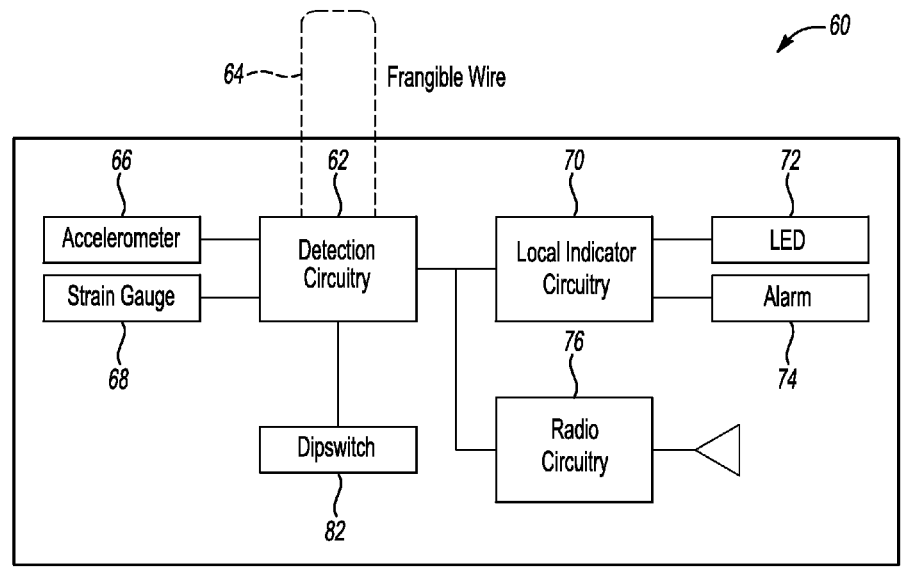
FIG. 4 is a block circuit diagram of an embodiment of a detection circuit according to an embodiment of the present invention.

While detailed embodiments of the present invention are disclosed herein, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Embodiments of the present invention relate to the use of frangible materials for absorbing impact energy. Embodiments of the present invention place frangible materials in impact environments, such as protective helmets, so as to leverage their unique energy-absorbing characteristics.

Traditional compliant foam and padding is commonly used in helmets and protective gear to dissipate unwanted loads such as impacts. These configurations include elastically recoverable components such as rubber and compliant foams, and a variety of other plastically strained structures that convert the impact energy into the work necessary to deform metal or plastic. In contrast, ceramics and glasses which might be used as effective energy absorbers because of their high strength to weight ratios. Such frangible materials exhibit crack propagation which reduce the transfer of stress to surrounding support structures, thereby reducing load sharing and energy absorbing ability of the system, as a whole. A cellular configuration of normally brittle materials is allows the structure to crumble controllably, as it absorbs mechanical energy. The cellular nature of a frangible foam material quickly arrests any cracks that might propagate through homogenous compliant foam such as that traditionally used in helmets and protective gear. Embodiments of the present invention use frangible, brittle materials to dissipate impact energy in a novel way. In some embodiments, the impact energy is used to change the state of the energy absorbing element from a rigid foam to a fine powder. The dissipative nature of this energy conversion mechanism results in the destruction or compromise of the frangible material. Typically, any compromised frangible material would have to be replaced before the helmet or protective gear is placed back into use.

Glass or ceramic material may be converted into a frangible cellular or foam variant that has a net density that is lower than that of the native material. For example, glass with a density of over 100 lb. per cubic foot can be converted into foamed glass with a density of only 20 lb. per cubic foot. The resulting porous mass naturally has a lower compressive strength than an equivalent volume of the native material, but deformation of the foamed variant is predictable, controllable. The density may be adjusted to control the energy absorbing characteristics of the foam when placed into a protective system. In general, the greater the density of the frangible material, the higher the impact threshold force will be before the frangible material is compromised to absorb energy. Adjusting the density and configuration of the frangible material permits the impact threshold and energy absorption capabilities to be tuned in the helmet system for a variety of different users and applications.

Foamed glass is a highly effective and versatile industrial insulating material made primarily from recycled glass. Foamed glass may be manufactured using a process that heats a mixture of the recycled glass and a carbon based material (coal powder) to approximately 1300 degrees Celsius. As the molten material slowly cools and anneals, gases (Carbon Dioxide and some Hydrogen Sulfide) may be released and trapped as gas bubbles in the glass, creating an expanded material having a volume of about 15 times the original glass material volume. Also known as foamed glass grain or cellular glass, foamed glass is lightweight and has fine pores. The volumes of crushed glass, cullet and coal powder, and their ratios to one another, are based on the density of the foamed glass being created. Densities may range from 7.5 pounds per cubic foot to 10 pounds per cubic foot. Other densities may be achieved by varying the manufacturing parameters. Higher-density foamed glass may have smaller pores than lower-density foamed glass.

FIG. 1 shows a cross-sectional view 10 of protective helmet 13 having an exterior shell 11 with interior and exterior surfaces, and a lining element arrangement 12 received therein.

In this exemplary embodiment, lining element arrangement 12 may comprise compliant foam 24 having one or more zones 18 and 19 containing frangible energy absorbing material, such as glass or ceramic foam. Zones 18 and 19 may be placed in any location within helmet 10. Alternatively, the entire lining element 12 may be comprised of frangible material. This configuration is not illustrated in FIG. 1.

Shell element 11 surrounding the foam 24 and frangible material zones 18 and 19 is typically constructed of plastic, fiberglass, carbon fiber or metal. In an alternative configuration, the helmet may be constructed entirely of foam 24 having frangible zones, and no outer shell 11. In yet another alternative, the helmet may be constructed entirely of frangible material.

The density and thickness of the frangible material disposed in the helmet may be selected depending on the magnitude of the anticipated impact for a given application. Preferably a suitable thickness of frangible material is disposed such that the entirety of the frangible material is not compromised. In this manner, a significant portion of the impact energy may be absorbed by the destruction of the frangible material. A lower density frangible material may be selected for implementations in which a lower impact threshold is desired for fracturing the material and absorbing energy. A higher density frangible material may be selected for implementations in which a higher impact threshold is desired for fracturing the material and absorbing energy.

Referring again to FIG. 1, frangible elements 18 and 19 may be encapsulated by a lining, to contain the frangible material. As explained in detail below, the geometrical configuration of the frangible material and lining may be varied to vary the performance and energy absorbing characteristics of the frangible zones. The lining may take a variety of forms, including vinyl, plastic, paper, or other material configured to collapse as the frangible material is compromised, while preferably containing the frangible material as it shatters upon impact. Materials to encapsulate or otherwise surround the frangible material may also include but are not limited to rubber, polyurethane, polystyrene, and expanded polystyrene.

According to one embodiment, frangible elements 18 and 19 are inserted into surrounding compliant foam 24. This arrangement allows replacement of the frangible elements 18 and 19 in the event they are compromised during an impact event. Preferably, frangible elements 18 and 19 that have been compromised are not placed back into the field and reused in the helmet 10. Adhesive, snaps, Velcro™ or clips may be used to attach or retain compliant and/or frangible material elements to the interior surface of the helmet shell 11. Adhesive, snaps, Velcro™ or clips may be also used to attach or retain frangible materials within compliant elements. In an alternative configuration, frangible elements 18 and 19 are adhered or releasably affixed to the exterior surface of the shell 11.

In other embodiments, more than one density frangible material may be implemented. For example, frangible elements 18 and 19 shown in FIG. 1 may include two or more layers of frangible material having different densities. Varying the densities of the frangible material may be useful in conditions where varying impact forces may be expected. Varying the densities of the frangible material may also increase the energy absorption of the combination in the event of an impact.

FIG. 2 is a cross-sectional view of an embodiment of helmet section 48 having outer shell 46 and inner lining 55. In this embodiment, frangible material 59 is encapsulated in a pad or container defined by lining 58. As the frangible material 59 is crushed in the event of an impact, container or pad 58 retains the dust created by the fracturing of the frangible material. The pad or container 58 may be removable and re-insertable into cavity 51 defined in the compliant foam 49. The pad may be located behind a layer of comfort foam 52 or fabric lining 55. Snaps, Velcro™ or clips (not shown) may be used to retain container or pouch 58 within helmet 10. In an alternative configuration, such as in a football helmet, pads 58 may be fastened to the interior of helmet shell 46 without interstitial compliant foam 49. In yet another configuration, container(s) 58 may be adhered or releasably affixed to the exterior surface of the shell 46.

In an alternative configuration illustrated in FIG. 3, pouch 58 may include both frangible material 28 and compliant material 30. Complaint material may be disposed on lining surface 57 nearest a person's head. Compliant material 30 may provide comfort and force distribution during smaller impacts, whereas frangible material 28 may provide energy absorption in the event of a larger impact following compaction of the compliant material 30.

Helmet 10 may be equipped with an electronic device for indicating that frangible material 18 and 19 has been, or may have been, compromised as a result of an impact. One embodiment of an electronic device 60 is illustrated in FIG. 4. Electronic device 60 may be encapsulated in compliant or frangible foam, or mounted in a safe location on the helmet 10 that is unlikely to come in contact with a person's head or neck. Electronic device 60 may include detection circuitry 62 for detecting whether an element of frangible foam (or compliant foam) has been, or likely has been, compromised due to an impact. Multiple techniques may be implemented for detecting such compromise.

In one example, a fine frangible wire 64 may be thread through the frangible or compliant foam. Detection circuitry 62 may send a low-power electrical DC current or an AC waveform through the wire to detect whether or not the frangible wire is in a close loop or open loop or high-impedance (i.e. broken) configuration. The gauge and arrangement of the wire in the frangible or compliant foam is configured such that an impact that compromises the foam causes the frangible wire to break. The open circuit in the frangible wire 64 detected at detection circuitry 62 indicates that the frangible and/or compliant foam has been, or may have been, compromised. In another example, an accelerometer 66 or strain gauge 68 may be configured to detect an impact of sufficient magnitude to compromise the frangible or compliant foam.

In the event the detection circuitry 62 detects that frangible and/or compliant foam has been or may have been compromised, circuitry may provide local and remote indicators of the compromise condition. For example, local indicator circuitry 70 may illuminate LED 72, or change the color (e.g. from green to red), in the event the detection circuitry 62 detects that frangible and/or compliant foam has been or may have been compromised. Alternatively, local indicator circuitry 70 may cause alarm 74 to make an audible sound or alarm tone indicating that frangible and/or compliant foam has been or may have been compromised. In yet another configuration, a dye pack may be affixed or adhered to the frangible foam such that compromise of the foam causes the dye pack to break, alerting the person wearing the helmet, or a coach, etc., that treatment of the person and/or replacement of the padding may be necessary.

In addition to, or as an alternative to, local indicators, radio circuitry may be provided that communicate a radio frequency (RF) signal that indicating that frangible and/or compliant foam has been or may have been compromised. The signal may be received by a receiver (not shown) informing a coach, parent, medical personnel or others that frangible and/or compliant foam has been or may have been compromised. Preferably, the radio circuitry 76 sends information including an identifier for the helmet, so that the person receiving the RF transmission can determine which helmet among a plurality of helmets has compromised foam. Radio circuitry 76 may receive input defining a unique ID for transmission in the event detection of compromised foam occurs. In one example, this input is provided by DIP switch 82.

The RF transmission may communicate additional information to the receiver, including the severity of the impact in the event an accelerometer 66 or strain gauge 68 is implemented. This information may permit a coach or medical personnel to respond appropriately depending on the severity of the impact. Circuitry 60 includes a battery (not shown) for powering the circuitry. LED 72 or other output device may indicate the status of the battery, including a battery low status. Preferably, the battery is located in a position in the helmet such that it is readily replaceable.

Figure 5:
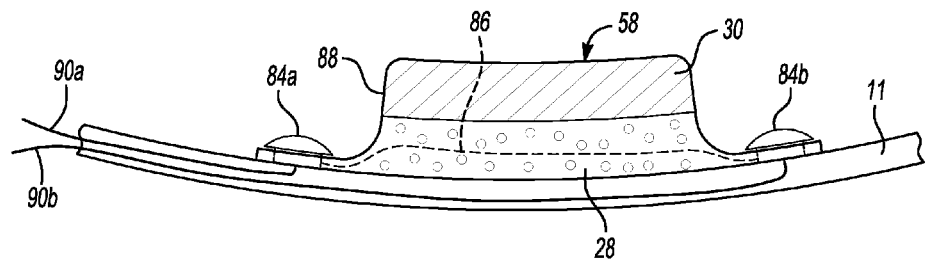
FIG. 5 is a cross-sectional view of an electrically-conductive snap-in pad including frangible and compliant material according to an embodiment of the present invention.

In an embodiment illustrated in FIG. 5, pads 58 including compliant foam 30 and frangible material 28 are placed within an exterior lining 88 (e.g. vinyl, etc.) having electrically-conductive snaps 84a and 84b for releasably affixing the pad 58 to the helmet shell 11. In this configuration, frangible wire segment 86 may be placed on or through the frangible material 28 inside the pad, and connected to snaps 84a and 84b for communicating electrical signals in the frangible wire to electrical leads 90a and 90b embedded within or otherwise affixed to associated helmet shell 11. Alternatively, the frangible wire 86 may be adhered to one or more points on the exterior of the frangible material 28 such that compromise of the frangible material 28 causes the frangible wire 86 to break and create an open circuit. Glues, epoxies and other adhesives may be used to adhere the frangible wire 86 to the exterior of the frangible material 28, such as the interface between the compliant foam 58 and frangible foam 28. Electrical leads 90a and 90b are, in turn, electrically connected to detection circuitry 62 illustrated in FIG. 4. In an alternative configuration, electrical connectivity between frangible wire 86 and leads 90a and 90b may be made with a traditional male/female electrical coupling. In helmets including a plurality of pads each including a separate frangible wire, detection circuitry may include an addressing scheme for the leads to each pad such that the circuitry may determine based on the addressing which pad has been compromised. This information may be relayed at the helmet or wirelessly to a remote receiver as described above. Alternatively, electrical contacts 84a and 84b associated with a plurality of pads may be connected in series such that compromise of any individual pad 58 will trigger an appropriate output.

Some of the figures depicted herein show a traditional motorcycle helmet configuration. Of course, embodiments of the present invention are not limited to helmets used for riding motorcycles. Embodiments of the present invention may be implemented in all types of helmets, protective head gear, and other protective devices including but not limited to bicycle helmets, sporting helmets (e.g. football, hockey, lacrosse, baseball, horseback, skiing, etc.), sports padding (e.g. shoulder pads, thigh pads, shin pads, etc.), military or law enforcement protective gear, and other personal protective devices in which the effects of harmful impacts are desired to be reduced.

Embodiments of the present invention may also be implemented in vehicle bumpers, doors and other body panels to absorb impact energy in the event of a collision. In the event embodiments of the present invention are implemented in vehicle bumpers or door/body panels, detection circuitry may be provided to monitor the frangible material for compromise, and outputting an indication to the vehicle instrument panel cluster in the event the frangible material becomes compromised.

Embodiments of the present invention may be used in product packaging. Frangible energy absorbing material may be embedded or encapsulated into foam or other traditional padding material used for product packaging. Alternatively, the frangible material may be cut or otherwise formed to shape and enclosed in a vinyl, rubber, plastic or other suitable material for containing the frangible material. Preferably, the geometry, density and containment of the frangible materials is selected with consideration of the force and geometry of the expected impact to optimize energy absorption. For example, frangible configurations may be molded or embedded into traditional Styrofoam™ for protecting the surfaces and corners of products for shipping.

In the event frangible materials are utilized for product packaging and shipping, circuitry similar to that of FIG. 4 may be implemented wherein radio circuitry 76 includes a modem and cellular telephone for long distance communication with a monitoring station. In this fashion, a product owner or shipper may monitor the status of the packaging, or be notified in the event it is compromised.

Embodiments of the present invention may also be used for paratrooper or humanitarian relief applications. For example, frangible energy absorbing units may be attached to or inserted within the soles of paratrooper boots to absorb energy at the moment the boots impact on the ground. Similarly, pallets of military and humanitarian goods dropped from a helicopter or plane may be equipped with contained frangible energy absorbing elements to absorb energy at the point of impact. The frangible elements may include layers or regions of varying density frangible materials, and may be contained in a number of different configurations such as those illustrated herein.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A protective helmet comprising:
    a protective shell having an interior surface and an exterior surface for protecting at least a portion of a person's head; and
    a padding layer affixed to a majority of the interior surface of the protective shell, the padding layer comprising a compliant foam material and a frangible glass foam material, wherein at least the frangible material is enclosed in a container.

2. The protective helmet of claim 1 additionally comprising a detection circuit configured to detect a compromise of the frangible material, and output an indicator in the event the compromise is detected.

3. The protective helmet of claim 2 wherein the detection circuit includes a frangible wire configured to break in the event the frangible material is compromised.

4. The protective helmet of claim 2 wherein the indicator is a LED.

5. The protective helmet of claim 2 wherein the indicator is one or more radio-frequency signals.

6. The protective helmet of claim 5 wherein the one or more radio-frequency signals includes an identifier for the helmet.

7. The protective helmet of claim 1 wherein the padding layer comprises a plurality of pads each containing compliant material and frangible material.

8. The protective helmet of claim 7 wherein the plurality of pads include one or more fasteners for releaseably affixing the pads to the interior surface of the protective shell.

9. The protective helmet of claim 7 wherein the pads include a frangible wire for electrical connection to a detection circuit configured to detect a compromise of the frangible material.

10. The protective helmet of claim 9 wherein the electrical connection includes electrically-conductive connectors for affixing the pads onto the helmet shell.

11. The protective helmet of claim 1 wherein the container is defined at least in part by the compliant material.

12. The protective helmet of claim 1 wherein the container is defined at least in part by the interior surface of the helmet shell.

13. Padding for a protective helmet comprising:
    one or more containers for attachment to a majority of an interior shell of a protective helmet, the containers including frangible glass foam material disposed in the container adjacent the protective shell, and compliant foam material disposed adjacent the frangible material.

14. The padding of claim 13 wherein the container is attached to the interior shell with a releasable fastener.

15. The padding of claim 14 wherein the fastener is electrically conductive.

16. The padding of claim 13 additionally comprising a frangible wire attached to the frangible material and configured to break upon compromise of the frangible material.

17. The padding of claim 16 wherein the frangible wire is connected to a circuit configured to detect compromise of the frangible material.

18. The padding of claim 17 wherein frangible wire is connected to the circuit using one or more electrically-conductive connectors for releaseably affixing the padding to the interior of the protective shell.

* * * * *